United States Patent [19]

Moody et al.

[11] 4,392,435
[45] Jul. 12, 1983

[54] TRANSPORT APPARATUS

[75] Inventors: Brian R. Moody, Darwen; Duncan B. Lowe, Mobberley; Derek W. Lowe, Southport, all of England

[73] Assignee: United Kingdom Atomic Energy Authority, London, England

[21] Appl. No.: 171,723

[22] Filed: Jul. 24, 1980

[30] Foreign Application Priority Data

Aug. 3, 1979 [GB] United Kingdom ............ 7927231

[51] Int. Cl.³ .................. B61B 13/08; B61B 13/10
[52] U.S. Cl. .................. 104/284; 104/281; 104/290; 198/619
[58] Field of Search ............ 104/154, 165, 281, 284, 104/290; 308/10; 376/268, 269, 270, 271; 414/146; 191/10; 46/234, 235, 239; 198/619, 805

[56] References Cited

U.S. PATENT DOCUMENTS

| 516,188 | 3/1894 | Dewey | 191/10 |
| 3,202,406 | 8/1965 | Tack | 198/619 X |
| 3,443,677 | 5/1969 | Tribe | 198/805 |
| 3,760,245 | 9/1973 | Halvorsen | 104/165 X |
| 3,820,470 | 6/1974 | Karch et al. | 104/284 |
| 3,849,724 | 11/1974 | Ghibu et al. | 104/284 X |
| 3,882,791 | 5/1975 | Youngscap | 104/154 |
| 3,996,858 | 12/1976 | Sangl | 104/290 X |
| 4,166,563 | 9/1979 | Peyraud et al. | 198/619 X |

FOREIGN PATENT DOCUMENTS

| 2043604 | 3/1972 | Fed. Rep. of Germany | 104/290 |
| 744292 | 2/1956 | United Kingdom . | |
| 1145264 | 3/1969 | United Kingdom . | |

Primary Examiner—Randolph Reese
Attorney, Agent, or Firm—William R. Hinds

[57] ABSTRACT

Transport apparatus comprises a drive unit and a slave unit movable in unison along a predetermined path. The slave unit is disposed beneath the drive unit to move along a tunnel with work stations located at intervals along the tunnel. The drive unit carries electromagnets which when energized levitate the slave unit within the tunnel, controls being provided to maintain the slave unit at a desired position relative to the drive unit. The roof of the tunnel is formed from a magnetically transparent material, such as glass. The slave unit is thereby physically isolated from the drive unit. As a result the drive unit is shielded from any hostile environment within the tunnel and resulting, for example, from the transport of radioactive or toxic materials by the slave units. This simplifies repair and maintenance operations on the drive unit.

5 Claims, 3 Drawing Figures

TRANSPORT APPARATUS

BACKGROUND OF THE INVENTION

The present invention concerns transport apparatus for transporting articles along a predetermined path. The invention relates more particularly to transport apparatus which can be remotely controlled and energized and which is suitable for use in contaminated environments.

For health and safety reasons it is usual to provide remotely controlled equipment for handling and transporting toxic or radioactive materials. In a known remotely controlled apparatus the motor for moving the materials is exposed to the contamination. It is therefore necessary to decontaminate the motor and its associated equipment before any servicing or repair work can be carried out.

It has been proposed to provide a transport apparatus comprising a carriage which is supported on a track and which has a motor unit comprising levitating magnets and a linear motor. The levitating magnets lift the carriage and by means of feedback transducers control the height and position of the carriage with respect to the track. The linear motor is used to propel the carriage along the track. In this known arrangement the levitating magnets and the drive motor are part of the carriage and would, if the apparatus is used for transporting contaminated materials, become contaminated. It would therefore be necessary to decontaminate the entire transport apparatus before the magnets and the drive motor could be serviced or repaired.

The aim of the present invention is to provide a transport apparatus capable of handling or transporting contaminated materials and in which component parts of the apparatus which are most likely to require maintenance during use are not exposed to the contamination.

STATEMENT OF THE INVENTION

According to the present invention there is provided a transport apparatus comprising a master drive unit and a slave unit movable in unison along a predetermined path in which the slave unit is magnetically coupled to and physically isolated from the drive unit.

Preferably the slave unit is disposed beneath the drive unit and is isolated from the drive unit by a magnetically transparent wall which can be glass. The wall can form a roof of a tunnel along which the slave unit can move between a plurality of work stations.

Conveniently, the drive unit is guided and supported on a track and is provided with electromagnets and feedback circuitry which monitors the positional relationship between the drive unit and the slave unit. The slave unit can be provided with strips of ferromagnetic material which are attracted upon energization of the electromagnets to levitate the slave unit within its tunnel, the separation and position of the slave unit with respect to the drive unit and thus the magnetic forces generated by the electromagnets being controlled in response to signals from the feedback circuitry.

DESCRIPTION OF THE DRAWINGS

The invention will be described further, by way of example, with reference to the accompanying drawings; in which.

DESCRIPTION OF THE PREFERRED EMBODIMENT

Figure 1:
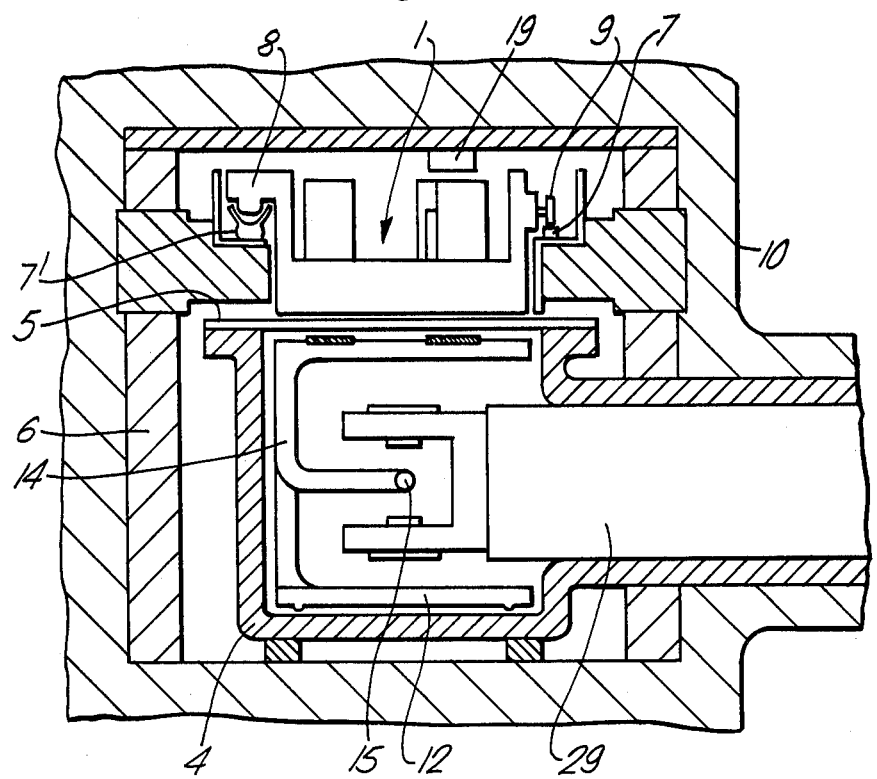
FIG. 1 is a diagrammatic part cross-sectional view of an embodiment of a transport apparatus having superimposed drive and slave units.
Figure 3:
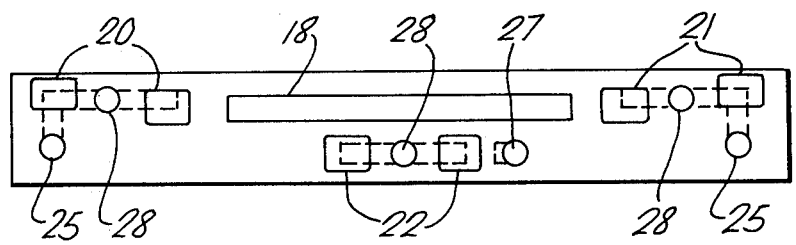
FIG. 3 is a diagrammatic plan view of the drive and slave units.
Figure 2:
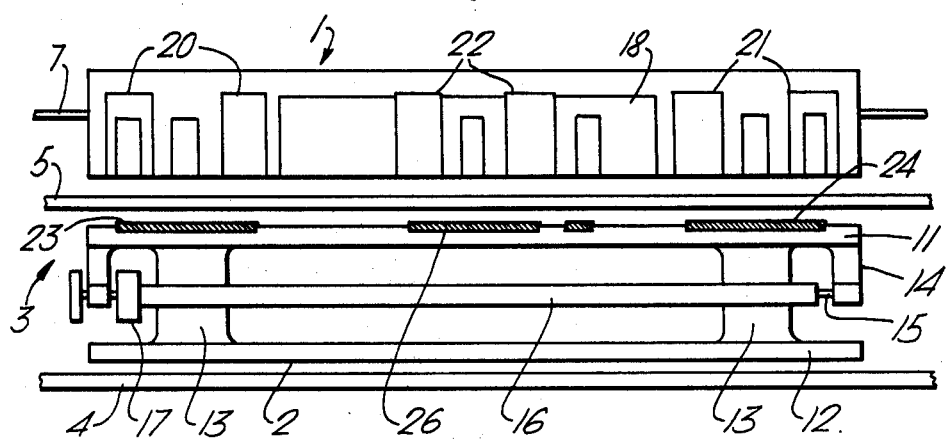
FIG. 2 is a diagrammatic longitudinal sectional view of the drive and slave units.

With reference to the drawings a transport apparatus comprises a drive unit 1 and an associated slave unit 2. The slave unit 2 is located within a tunnel 3 of substantially rectangular section and formed from a U-shaped trough 4 covered by a flat roof 5 which is secured, preferably sealed, to the trough. A support frame 6 straddles the tunnel 3 and carries rails 7 and tracks $7^1$ for the drive unit 1. In the illustrated embodiment, and by way of example only, the left hand side of the drive unit has an outwardly extending limb 8 which cooperates with, and slides in track $7^1$, while the right hand side of the drive unit is provided with spaced apart wheels 9 which which run on rail 7. The transport apparatus can be located within a shielding 10 for radioactivity, the shielding being capable of dismantling to allow access to the apparatus for maintenance.

The slave unit 2 comprises a lightweight, rigid frame having upper and lower plates 11 and 12 respectively interconnected by webs 13 located adjacent the opposite ends of the plates. A substantially L-shaped bracket 14 extends from each end of the upper plate to terminate approximately midway between the plates. Each bracket 14 carries a mounting 15 between which a workpiece, such as a nuclear fuel rod 16, can be detachably mounted. In addition, an auxiliary motor 17 conveniently a DC shunt wound motor powered by a rechargeable dry cell battery can be provided to rotate the workpiece through one of the mountings 15. The motor 17 is controlled remotely by equipment external to the tunnel 3.

The drive unit 1, supported for movement along the tracks and rails 7, $7^1$ can be propelled by a linear electric motor 18. Preferably, a linear vernier reluctance motor is employed which can provide accurate control at low speeds of movement. The motor 18 is mounted on the drive unit and comprises an in-line group of electromagnets which cooperate with a series of passive poles incorporated in a monorail 19 located above the drive unit and extending along the axis of the tunnel. Preferably, the electromagnets of the motor 18 are spaced apart at a pitch which is slightly greater than the spacing between the passive poles of the monorail 19 to produce a vernier relationship. When energized the electromagnets react with the poles of the monorail to propel the drive unit 1 along the track on rail 7. The speed of propulsion is adjustable.

Alternatively, a mechanical arrangement, for example a rack and pinion, can be employed to propel the drive unit 1.

The drive unit 1 is further provided with electromagnets which cooperate with ferromagnetic strips on the slave unit 2 to levitate the slave unit within the tunnel 3. The electromagnets are conveniently arranged in three pairs, namely a first and second pair, 20 and 21 respectively, adjacent the respective ends of the drive unit and a third pair 22 positioned approximately midway along the length of the drive unit. The first and second pair 20, 21 are disposed on the opposite side of the longitudinal axis of the drive unit to the third pair 22. Each end pair is arranged in an opposed, off-center position, relative to the axis of a respective cooperating ferromagnetic strip 23, 24 on the slave unit. The strips are L-shaped, the electromagnets being disposed above the limb of the L extending parallel to the longitudinal axis of the drive unit with a control transducer 25 being arranged above the other limb of the L-shaped strip. The transducers 25 senses lateral shifts in the position of the slave unit and initiate signals to vary the power relationship of the electromagnets in the first and second pairs whereby to monitor and correct any lateral deviations in the position of the slave unit in the tunnel. A similar arrangement is employed to maintain the longitudinal position of the slave unit 2. The third pair of electromagnets 22 are mounted on the drive unit directly above but slightly over the ends of an associated ferromagnetic strip 26 on the slave unit. A control transducer 27 senses the position of a disc on the surface of the plate of the slave unit and corrects any drift of the slave unit by appropriate adjustment of the power relationship of the pair of electromagnets.

It is further necessary to provide a control to limit the upward movement of the slave unit upon energization of the pairs of electromagnets whereby to prevent the slave unit coming into contact with the roof 5 of the tunnel. This is achieved by proximity transducers 28 which monitor the gap between the electromagnets and their associated ferromagnetic strips on the slave unit. The transducers feed back to a power control source for the apparatus to constantly balance the electromagnetic force against the weight of the slave unit for a prescribed gap.

As a result of the above it is possible to achieve and maintain an accurate positional relationship between the drive unit and the slave unit. The slave unit is magnetically coupled for travel to the drive unit but is physically isolated within the tunnel 3. Bus bars (not shown) can be provided to transit power to the various electromagnets.

The workpiece 16 mounted on the above unit can be moved between a number of work stations arranged along the path of travel and at which work operations can be performed on the workpiece. FIG. 1 shows a tool post 29 for performing a particular operation on the work piece at a work station.

It will be appreciated that the apparatus can include a plurality of drive units and associated slave unit which are movable in succession along the length of the apparatus between an entry post and an exit post. Storage facilities can be provided at the entry post and the exit post. The position of a magnetically coupled drive and slave unit in travelling along the apparatus can be monitored by laser means. Thus each drive unit can carry a laser-reflecting corner cube positioned to receive a laser beam projected along the apparatus above the roof of the tunnel. The beam is reflected back by the cube and the reflected beam can be directed by an interferometer through a fringe counter which registers changes in position of the reflector and hence the drive unit. As the drive unit is magnetically coupled to the slave unit it is thereby possible to achieve an accurate record of the velocity and distance of the slave unit from a known datum, the velocity computation being a fringe count against time performed electronically. By feeding the velocity output to the control for the linear motor it is possible to correct any drift from a prescribed speed of travel of the slave unit along the tunnel. The distance of each toolpost from the datum is known and constant.

Conveniently, the tunnel and roof are formed from glass which can present a smooth surface which can be cleaned easily. Alternatively, the tunnel can be formed from ceramic materials or natural minerals such as slate and granite and the roof from glass.

When the apparatus is employed to transport radioactive materials, such as nuclear fuel rods, it is necessary to protect and safeguard personnel from radioactivity and other harmful emissions. The tunnel provides a degree of shielding against contamination remaining in the tunnel whereby to allow removal of the main shielding to give access to the apparatus. Maintenance, repair and other work can be performed on the drive unit as it is outside the tunnel and separated from the interior of the tunnel, which can be contaminated, by the roof.

In operation, the slave unit is levitated within the tunnel upon energization of the levitating electromagnets on the drive unit. The slave unit is held clear of the walls of the tunnel by the action of the monitoring transducers. The drive unit is isolated from the slave unit and the environment of the slave unit by means of the magnetically transparent roof.

It will be appreciated that other constructional arrangements are possible and that the invention is not confined to the embodiment described with reference to the drawings.

We claim:

1. An apparatus for transporting toxic or radioactive articles comprising an enclosed passageway defining a path of travel for the articles, at least one work station positioned along and communicating with said passageway intermediate its ends, a movable drive unit located outside the passageway, a juxtaposed slave unit within the passageway forming a carrier for an article movable in unison with the drive unit, electromagnet means on the drive unit to couple the drive unit to the slave unit for movement, control means for maintaining the slave unit magnetically suspended within the passageway and at a desired position relative to the drive unit upon energization of the electromagnet means, a barrier of magnetically transparent material extending along the passageway and positioned between the drive unit and the slave unit to physically isolate the drive unit from the slave unit and to protect the drive unit from contamination within the passageway arising from the toxic or radioactive articles whereby to permit ready access to the drive unit for maintenance and the like operations.

2. An apparatus according to claim 1 in which the slave unit is disposed beneath the drive unit with the barrier forming a roof for the passageway.

3. An apparatus according to claim 2 in which the roof is glass.

4. An apparatus according to claim 2 including ferromagnetic strips on the slave unit cooperable with said electromagnet means on the drive unit for levitating the slave unit within the passageway.

5. An apparatus according to claim 1 including linear motor means for propelling the drive unit.

* * * * *